United States Patent [19]

Shoh

[11] 4,348,908
[45] Sep. 14, 1982

[54] POWER MEASURING ARRANGEMENT FOR VIBRATORY WELDER

[75] Inventor: Andrew Shoh, Ridgefield, Conn.

[73] Assignee: Branson Ultrasonics Corporation, Newtown, Conn.

[21] Appl. No.: 226,195

[22] Filed: Jan. 19, 1981

[51] Int. Cl.³ .................................................. G01L 3/24
[52] U.S. Cl. ............................... 73/862.54; 73/862.04; 73/862.68; 228/56.5
[58] Field of Search ........... 73/862.04, 862.38, 862.54, 73/862.68, 9; 228/56.5, 2

[56] References Cited

U.S. PATENT DOCUMENTS 3,056,192 10/1962 Jones ............................... 228/56.5 X
3,582,691 6/1971 Sonderegger et al. ......... 73/DIG. 4
4,157,658 6/1979 Grice, Jr. .......................... 73/862.28

FOREIGN PATENT DOCUMENTS 172529 6/1965 U.S.S.R. ........................... 73/862.54

OTHER PUBLICATIONS

Hollander et al.–"Friction Welding Parameter Analysis"–44th Annual Meeting, American Welding Society, Apr. 22-26, 1963, pp. 1-28.

Primary Examiner—Charles A. Ruehl
Attorney, Agent, or Firm—Ervin B. Steinberg; Philip J. Feig

[57] ABSTRACT

A power measuring arrangement is incorporated in a vibration welder at the area of welding workpieces. The arrangement comprises force and velocity sensing means, each providing respective electrical output signals which are multiplied to provide an output signal of the actual power available at the weld plane.

7 Claims, 4 Drawing Figures

U.S. Patent  Sep. 14, 1982  4,348,908
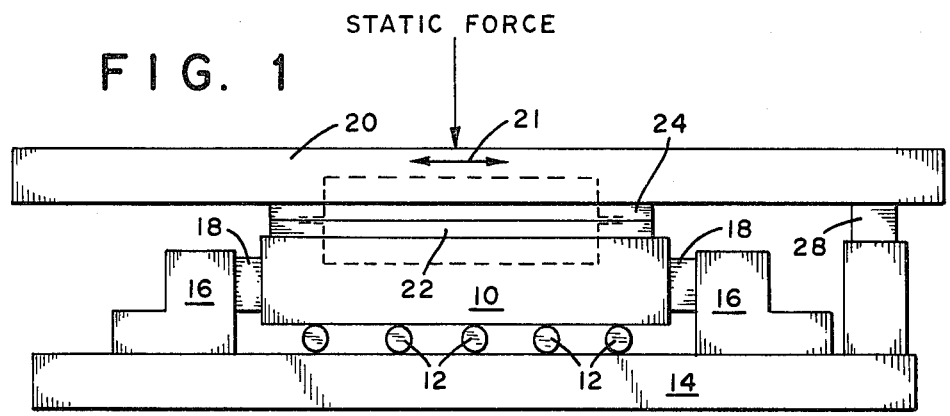
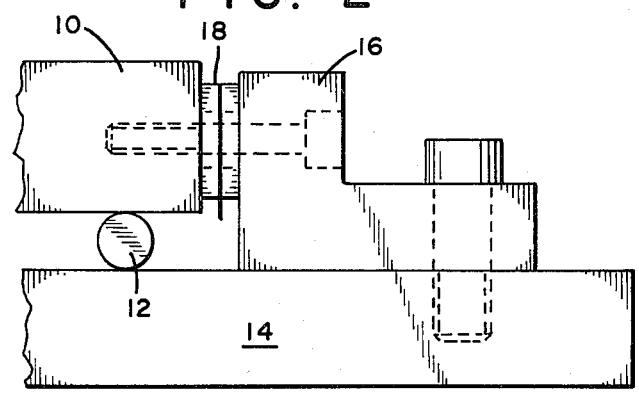
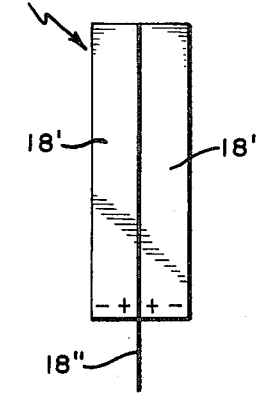
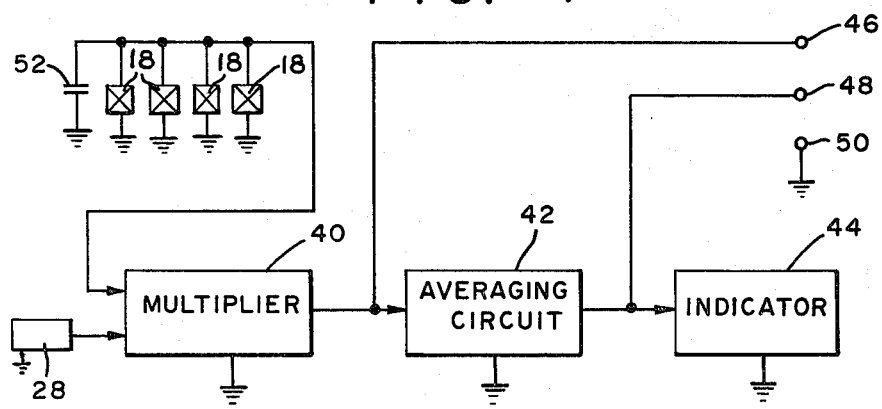

POWER MEASURING ARRANGEMENT FOR VIBRATORY WELDER

BRIEF SUMMARY OF THE INVENTION

This invention relates to vibratory welding apparatus and particularly to an arrangement for measuring the power provided by a vibratory welding apparatus. In vibration welding, parts of metal or plastics are clamped under pressure normal to the weld plane, and relative movement of the parts is induced in the plane of the weld, causing the parts to slip with respect to each other and generate heat at the interface. Ideally, one part is rigidly attached to a driver plate while an opposing part is rigidly attached to a stationary fixture plate so that the relative motion of the two parts is equal to the motion between the driver plate and the fixture plate.

In U.S. Pat. No. 3,920,504 dated Nov. 18, 1975 issued to A. Shoh et al and entitled "Friction Welding Apparatus" a typical vibratory welding apparatus is shown which has proven extremely successful for welding a variety of plastic parts. The driver plate in the mentioned apparatus is driven by electromagnetic means, typically at 60 or 120 Hz, to cause a vibratory excursion of the driver plate at 120 or 240 Hz, the frequency of the magnetic force being twice that of the applied voltage.

One of the problems encountered heretofore has been the inability to measure the usable power output available from a vibratory welder. Determination of power is desired for two principal reasons, namely for testing and evaluating the power provided by different welders, either for quality assurance purposes or for evaluating competitive products, and secondly for process optimization purposes. While it always has been possible to measure the input power and then estimate the available welding power delivered to the workpiece to be welded by subtracting the estimated internal machine losses, such a method is inexact and does not provide an immediate readout of the net power. Thus, there has been a need to accurately determine the instantaneous usable power output of the welder at the area of welding the workpiece.

The present invention specifically provides an arrangement for measuring the power output provided by a vibratory welder at the weld area. Power determination is made while a workpiece is welded, therefore, yielding highly accurate and useful data which are not based on an estimate.

One of the principal objects of the present invention is the provision of an arrangement for determining the usable power output of a vibratory welder.

Another important object of the present invention is the provision of a measuring arrangement for indicating the power output of a vibratory welder while the welder is welding a workpiece.

Another and further important object of the present invention is the provision of a relatively simple and inexpensive arrangement for measuring the power output of a vibratory welding apparatus under operating conditions of the welder.

Further and still other important objects of the invention will become more clearly apparent by reference to the following description when taken in conjunction with the accompanying drawings.

BRIEF DESCRIPTION OF THE DRAWINGS

FIG. 1 is a schematic representation of a vibratory welder;

FIG. 2 is an enlarged view of a portion of the construction shown in FIG. 1;

FIG. 3 is a detailed view of a force sensing means, and

FIG. 4 is a schematic electrical circuit diagram of the power measuring circuit comprising the invention.

DETAILED DESCRIPTION OF THE INVENTION

The heat produced per unit of time at the interface of the workpiece to be welded is the usable power output of the welder and is equal to the average product of the instantaneous values of the force and velocity in the weld plane. The force is the shear force resisting relative slippage of the two parts to be welded and is a function of the part geometry, material, clamping force, and slip velocity. The velocity is the slip velocity of one part relative to the opposing part. Both quantities (force and slip velocity) are periodic time varying functions, analogous to alternating voltages and currents in electric machinery.

In principle, the present invention comprises a floating plate fixture arrangement for providing an electrical signal which is proportional to the shear force, and a velocity measuring probe for providing an electrical signal which is proportional to the relative velocity between the moving driver plate and the stationary fixture plate.

The electrical force and velocity analogs are multiplied (using a Hall effect device or similar means) to obtain instantaneous power, which is averaged and used for visual display or electrical readout purposes in a manner identical to processing voltages and currents in conventional electronic wattmeters.

Referring now to the figures and FIG. 1 and FIG. 2 in particular, a floating fixture plate 10 rests on rollers 12 which, in turn, are supported by a stationary base 14. The floating fixture plate 10 is restrained from lateral movement by a set of end blocks 16 and respective force sensors 18. The rollers 12 provide a rigid support for the high clamping force (not shown) which is applied perpendicular to the weld plane, yet the rollers 12 allow for infinitesimal movement of the floating plate 10 required to sense lateral shear force. However, in principle the described arrangement would work without the rollers.

Each force sensing means 18 comprises an assembly of two polarized piezoelectric disks 18' with an electrode 18" disposed in the center, see FIG. 3. The outer surfaces of the disks 18 will be connected to ground. As is well known to those skilled in the art, an electrical potential is generated across each piezoelectric disk responsive to its mechanical deformation, which in the present case is caused by the minute lateral displacement of the plate 10. A total of four force sensing means 18 are used, two force sensing means between each end of the plate 10 and the respective block 16. The electrodes of all force sensing means are connected in parallel. To obtain proper summation of signals the force sensing means at the opposite ends of the floating plate 10 are phased opposite to each other so that a positive pressure at one end of the floating plate 10 will produce a positive voltage while a positive pressure at the opposite end of the plate will produce a negative voltage.

A movable driver plate 20 is disposed above the fixture plate 10. The lower part 22 of a workpiece is supported in the generally stationary fixture plate 10 while the upper part 24 of the workpiece is supported in the movable driver plate 20, see U.S. Pat. No. 3,920,504 supra. The parts 22 and 24 meet along a weld plane defined by the interface surface plane between the two workpiece parts. The driver plate 20, for welding the workpiece parts to one another, is urged by static force means, not shown, toward the stationary plate 10, the force means applying a force generally perpendicular to the weld plane. Reciprocating motion, see arrow 21, in a direction parallel to the weld plane is provided by suitable means, such as electromagnetic means shown in the patent supra. The relative velocity between the plates 10 and 20 is measured by a suitable probe 28, such as a commercially available eddy current probe. The probe is referenced to the base plate 14 and is suitably spring loaded for being urged toward continuous contact with the driver plate 20 since the distance between the two plates changes slightly during welding as the parts 22 and 24 soften at their mating surfaces during the weld cycle.

Referring now to FIG. 4, the four force sensing means 18, such as the piezoelectric sensing means illustrated in FIG. 3, are coupled in parallel and provide their electrical output signal to one input of a multiplier circuit 40, while the velocity sensing probe 28 provides the other electrical signal to the multiplier circuit 40. The output signal from the multiplier circuit 40 is fed to an averaging circuit 42, such as a capacitor-resistor combination, and the output from the averaging circuit 42 is applied to a power readout means 44 which indicates an average power reading. Instantaneous power readout is obtained between terminals 46 and 50 and average power between terminals 48 and 50. Capacitor 52 is provided for reducing the voltage appearing across the force sensors.

The above described arrangement has proven successful for measuring the net weld power directly as contrasted with estimating such power from the gross electrical input and the welder losses. The arrangement, as indicated above, has been helpful in testing and evaluating usable weld power, both for testing manufactured vibratory welders against one another and also for testing welders against competitive products. Furthermore, the arrangement described above has been used for optimizing the welding process applicable to specific workpieces. A still further and important aspect of the instant arrangement has been the ability to closely monitor the power when welding workpieces in production, thereby supervising the quality of the welding process and providing the possibility to immediately correct the process if an anomaly in the power characteristic is noted.

Whereas the above embodiment describes primarily a measuring arrangement incorporated in a linear vibration welder, it will be apparent to those skilled in the art that the same arrangement can easily be incorporated also in a torsional vibration welder. A welder of this latter type is described, for instance, in U.S. Pat. No. 3,062,695, issued to Walter E. Hull, issued June 30, 1959 and entitled "Method and Means for Securing Together Thermoplastic Members".

What is claimed is:

1. A power measuring arrangement in combination with a vibratory welder wherein two workpiece parts to be welded are disposed respectively in a substantially stationary plate and an opposing driver plate and wherein said plates are urged toward contact with each other to provide forced contact between said workpiece parts perpendicular to a weld plane defined by the surface along which the parts are to be welded and wherein said driver plate is reciprocatingly vibrated along said weld plane, the improvement comprising:
   means disposed for providing a first electrical signal commensurate with the force exerted by the substantially stationary plate in the weld plane;
   means disposed for providing a second electrical signal responsive to the velocity of the driver plate relative to said stationary plate in the weld plane;
   multiplying means coupled for receiving said first signal and said second signal and providing an output signal which is proportional to the product of said first signal and of said second signal, and
   means coupled for averaging said output signal and indicating a value commensurate with the averaged output signal.

2. A power measuring arrangement as set forth in claim 1, said means providing said first signal being piezoelectric means and said means providing said second signal being an eddy current probe.

3. A power measuring arrangement as set forth in claim 1, said stationary plate being restrained against substantial motion in the weld plane by a pair of lateral blocks, and said means providing said first signal comprising a pair of piezoelectric sensing means, one sensing means disposed between each block and the lateral edge of said substantially stationary plate.

4. A power measuring arrangement as set forth in claim 3, said substantially stationary plate being supported on rollers which are disposed on a stationary base.

5. A power measuring arrangement as set forth in claim 3, said substantially stationary plate being mounted to permit infinitesimal motion of said latter plate in the direction of the weld plane in order to enable said force sensing means to be effective.

6. A power measuring arrangement as set forth in claim 3, said piezoelectric sensing means being arranged to cause positive pressure exerted by one end of said substantially stationary plate to provide a positive output voltage from the respective sensing means, and positive pressure exerted by the other end of said substantially stationary plate to provide a negative output voltage from the respective piezoelectric sensing means.

7. A power measuring arrangement as set forth in claim 3, each piezoelectric sensing means comprising a pair of juxtaposed piezoelectric disks with an electrode disposed therebetween.

* * * * *